US012689122B2

(12) United States Patent
Lin et al.

(10) Patent No.: US 12,689,122 B2
(45) Date of Patent: Jul. 21, 2026

(54) ANTENNA DEVICE WITH ELECTRONICALLY CONTROLLED THREE-STAGE PHASE SHIFTER AND THREE-STAGE PHASE SHIFTER

(71) Applicant: WHA YU INDUSTRIAL CO., LTD., Hsinchu City (TW)

(72) Inventors: Tso-Hua Lin, Hsinchu City (TW); Tsung-Ching Lin, Hsinchu City (TW); Bo-Yu Liao, Hsinchu City (TW)

( * ) Notice: Subject to any disclaimer, the term of this patent is extended or adjusted under 35 U.S.C. 154(b) by 225 days.

(21) Appl. No.: 18/668,508

(22) Filed: May 20, 2024

(65) Prior Publication Data

US 2025/0357665 A1 Nov. 20, 2025

(51) Int. Cl.
*H01Q 3/36* (2006.01)
*H01Q 21/22* (2006.01)

(52) U.S. Cl.
CPC ............... *H01Q 3/36* (2013.01); *H01Q 21/22* (2013.01)

(58) Field of Classification Search
CPC ............. H01Q 3/34; H01Q 3/36; H01Q 21/22
USPC ............ 342/372
See application file for complete search history.

(56) References Cited

U.S. PATENT DOCUMENTS

| | | | | |
|---|---|---|---|---|
| 4,649,393 | A * | 3/1987 | Rittenbach | H01Q 3/38 333/139 |
| 5,537,242 | A * | 7/1996 | Lim | H01Q 3/36 349/23 |
| 5,818,385 | A * | 10/1998 | Bartholomew | H01Q 3/005 342/372 |
| 7,969,359 | B2 * | 6/2011 | Krishnaswamy | H01P 1/185 342/372 |
| 9,966,661 | B2 * | 5/2018 | Xue | H01Q 3/34 |
| 10,187,029 | B1 * | 1/2019 | Tabatabai | H01P 1/184 |
| 2008/0297414 | A1 * | 12/2008 | Krishnaswamy | H03L 7/087 342/368 |
| 2018/0151953 | A1 * | 5/2018 | Yoshida | H01Q 3/2694 |

* cited by examiner

*Primary Examiner* — Brady W Frazier
(74) *Attorney, Agent, or Firm* — EGBERT, MCDANIEL & SWARTZ, PLLC

(57) ABSTRACT

Disclosed is an antenna device with an electronically controlled three-stage phase shifter and a three-stage phase shifter. The antenna device includes multiple three-stage phase shifters, an array antenna, an electronic control unit, and a power distribution network. Each three-stage phase shifter has a first phase shifting section, a second phase shifting section, and a third phase shifting section connected sequentially in series. Each three-stage phase shifter is coupled to the power distribution network and the array antenna. The power distribution network feeds radio frequency (RF) signals into each three-stage phase shifter, and each three-stage phase shifter feeds RF signals out to the array antenna. Each three-stage phase shifter is coupled to the electronic control unit, which controls the input control signals to each three-stage phase shifter, thereby varying the beam angle of the radiation field pattern of the array antenna.

6 Claims, 13 Drawing Sheets

ANTENNA DEVICE WITH ELECTRONICALLY CONTROLLED THREE-STAGE PHASE SHIFTER AND THREE-STAGE PHASE SHIFTER

CROSS-REFERENCE TO RELATED APPLICATIONS

Not applicable.

BACKGROUND OF THE INVENTION

The present invention relates to an antenna device, in particular to an antenna device with an electronically controlled three-stage phase shifter and a three-stage phase shifter.

An array antenna is a group of antennas that can adjust the beam pattern of its radiation field to increase gain or improve directivity.

A varactor-loaded Schiffman phase shifter is used as a first-stage phase shifter for the array antenna. By changing the DC voltage input to this first-stage phase shifter, the beam angle of the radiation field pattern of the array antenna can be varied.

Existing array antennas can only achieve the initial phase shift using the first-stage phase shifter shown in FIGS. 3 and 4, where the phase delay angle is set to 120°. To change the beam angle of the radiation field pattern over the full 360° circumference of the array antenna, multiple array antennas must be used to allow the different array antennas to emit radio waves in different directions, which results in the antenna device taking up more space. Additionally, the beam angle range that the first-stage phase shifter can adjust for the transmit signal pattern of the array antenna is limited to within ±20°.

For the array antenna with the first-stage phase shifter controlled by an input voltage, its power supply circuit cannot automatically adjust the output voltage, and manual adjustment is required by removing the array antenna.

SUMMARY OF THE INVENTION

The main purpose of the present invention is to provide an antenna device with an electronically controlled three-stage phase shifter and a three-stage phase shifter.

To achieve the aforementioned purpose, the present invention adopts the following technical solution:

An antenna device with an electronically controlled three-stage phase shifter, comprising multiple three-stage phase shifters, an array antenna, an electronic control unit; and a power distribution network; wherein the array antenna is primarily composed of multiple antenna arrays arranged in a pattern, each antenna array is coupled to at least one three-stage phase shifter, and each three-stage phase shifter consists primarily of a first phase shifting section, a second phase shifting section, and a third phase shifting section connected sequentially in series; each three-stage phase shifter is coupled to a radio frequency (RF) signal input terminal and an RF signal output terminal, wherein each RF signal input terminal is coupled to the power distribution network, and the three-stage phase shifters are parallel to each other and are each coupled to the array antenna through the respective RF signal output terminals, allowing the power distribution network to feed an input RF signal to each three-stage phase shifter through the respective RF signal input terminals, and each three-stage phase shifter to feed an output RF signal to the array antenna through the respective RF signal output terminals The three-stage phase shifters are parallel to each other and are each coupled to the electronic control unit, allowing the electronic control unit to control the input control signals to each three-stage phase shifter.

The present invention enables the electronic control unit to change the control signals input to each three-stage phase shifter, varying the beam angle of the radiation field pattern of the array antenna. By utilizing the three-stage phase shifters, a three-stage phase shift can be achieved, reducing the number of array antennas required for the antenna device and minimizing the space occupied by the antenna device.

By transmitting the control signals to each of the three-stage phase shifters through the electronic control unit, the present invention further eliminates the need to remove the array antenna for adjustment during the process of changing the beam angle.

DETAILED DESCRIPTION OF THE INVENTION

Figure 1:
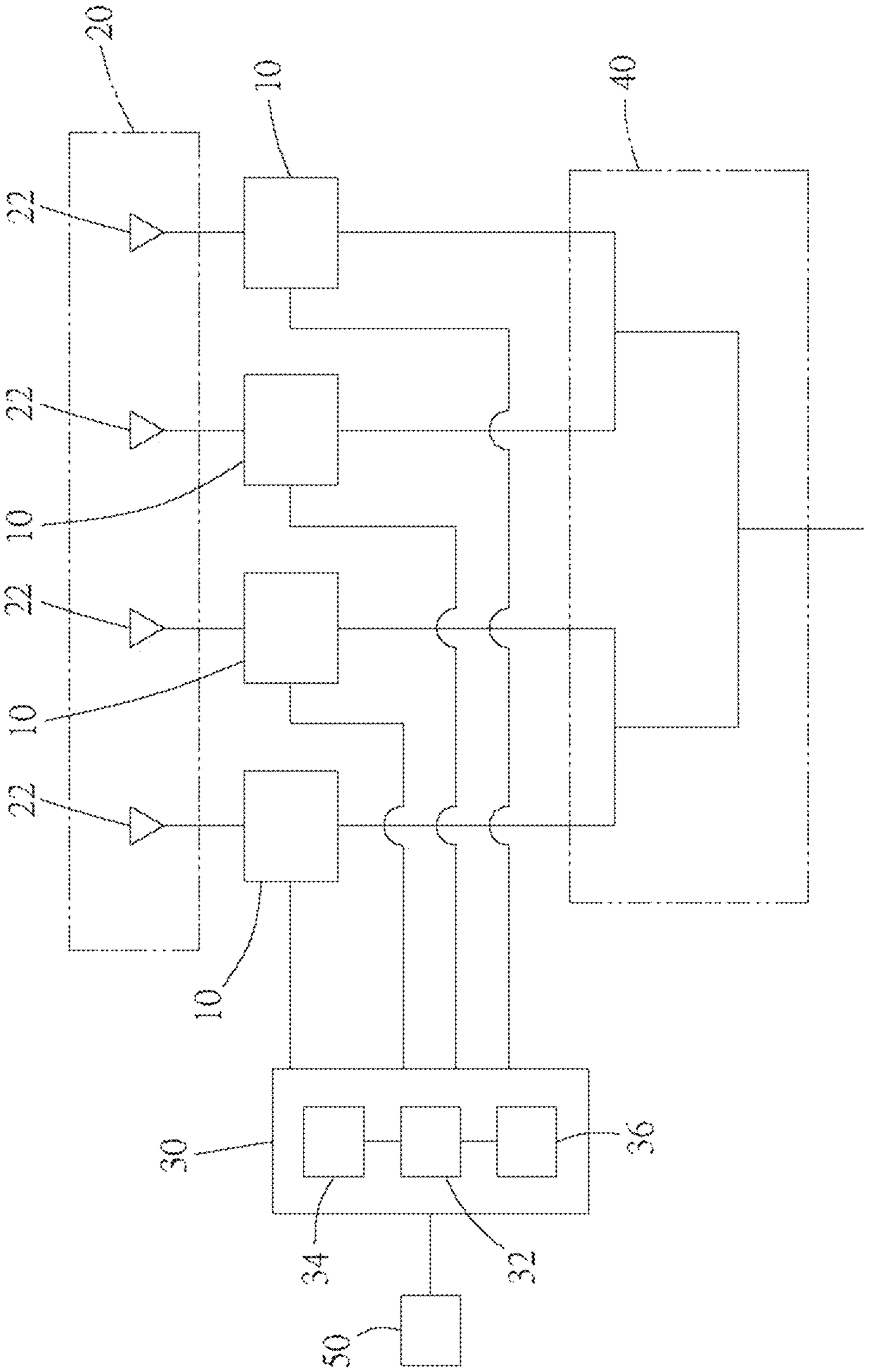
FIG. 1 is a system architecture diagram for controlling the horizontal polarization field pattern beam of a preferred embodiment of the present invention.
Figure 2:
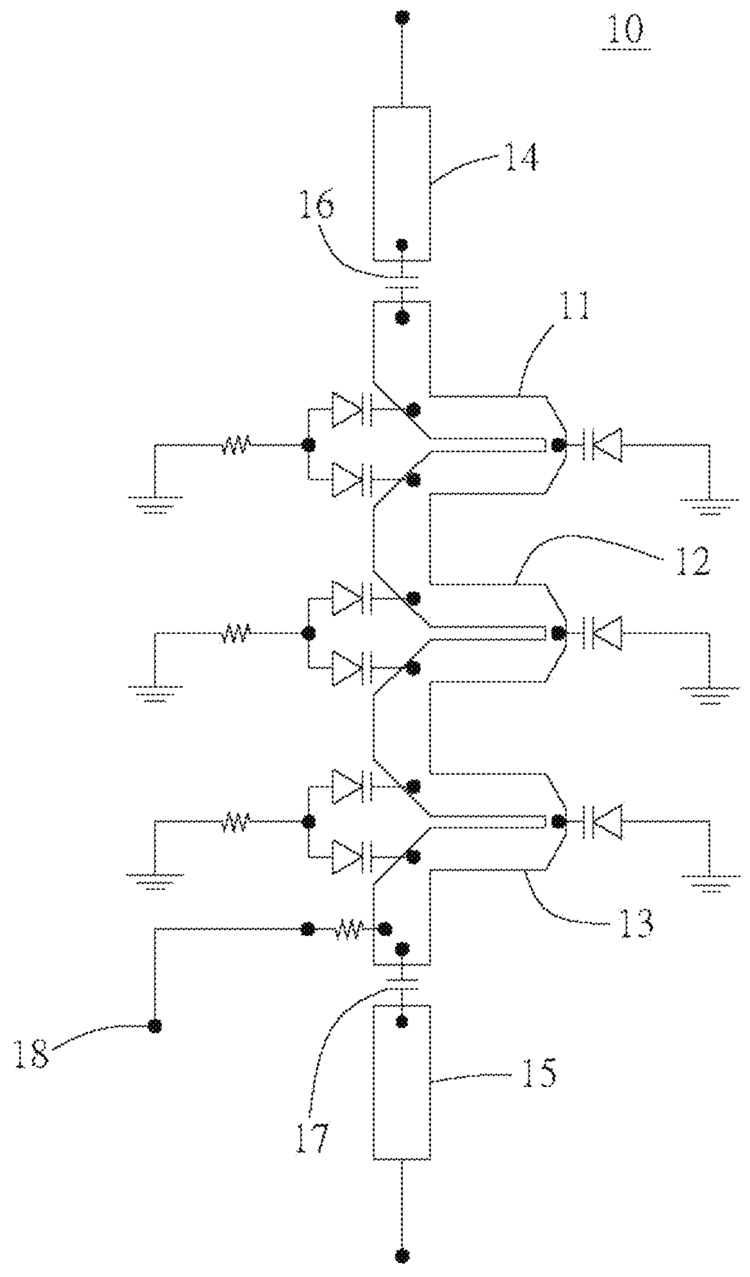
FIG. 2 is a schematic diagram of the circuit for the three-stage phase shifter of a preferred embodiment of the present invention.

As shown in FIGS. 1 and 2, a preferred embodiment of the electronically controlled three-stage phase shifter antenna device comprises multiple three-stage phase shifters 10, an array antenna 20, an electronic control unit 30, and a power distribution network 40. The array antenna 20 is primarily composed of multiple antenna arrays 22 arranged in a pattern, and each antenna array 22 is coupled to the at least one three-stage phase shifter 10. Each three-stage phase shifter 10 consists primarily of a first phase shifting section 11, a second phase shifting section 12, and a third phase shifting section 13 connected sequentially in series, and the first phase shifting section 11, the second phase shifting section 12, and the third phase shifting section 13 each employ a varactor-loaded Schiffman phase shifter. Each three-stage phase shifter 10 is coupled to a radio frequency (RF) signal input terminal 14 and an RF signal output terminal 15. Each of the RF signal input terminals 14 is coupled to the power distribution network 40, and the three-stage phase shifters 10 are parallel to each other and are each coupled to the array antenna 20 through the respective RF signal output terminals 15, so that the power distribution network 40 can feed an input RF signal to each three-stage phase shifter 10 through the respective RF signal input terminals 14, and each three-stage phase shifter 10 can feed an output RF signal to the array antenna 20 through the respective RF signal output terminals 15, thereby enabling the three-stage phase shifters 10 to control the field pattern beam of the transmitted signal of the array antenna 20. FIG. 1 illustrates the system architecture for controlling the horizontal polarization field pattern beam of a preferred embodiment.

The array antenna 20 and the power distribution network 40 are both prior art familiar to those skilled in the relevant art, so their specific configurations will not be described in detail.

The three-stage phase shifters 10 are parallel to each other and are each coupled to the electronic control unit 30, allowing the electronic control unit 30 to control the input control signals to each three-stage phase shifter 10. The control signal is selected from any one of electronic signals such as DC voltage, current, magnetic field, low-frequency signal, high-frequency signal, signal phase, electromagnetic signal, and pulse.

Figure 3:
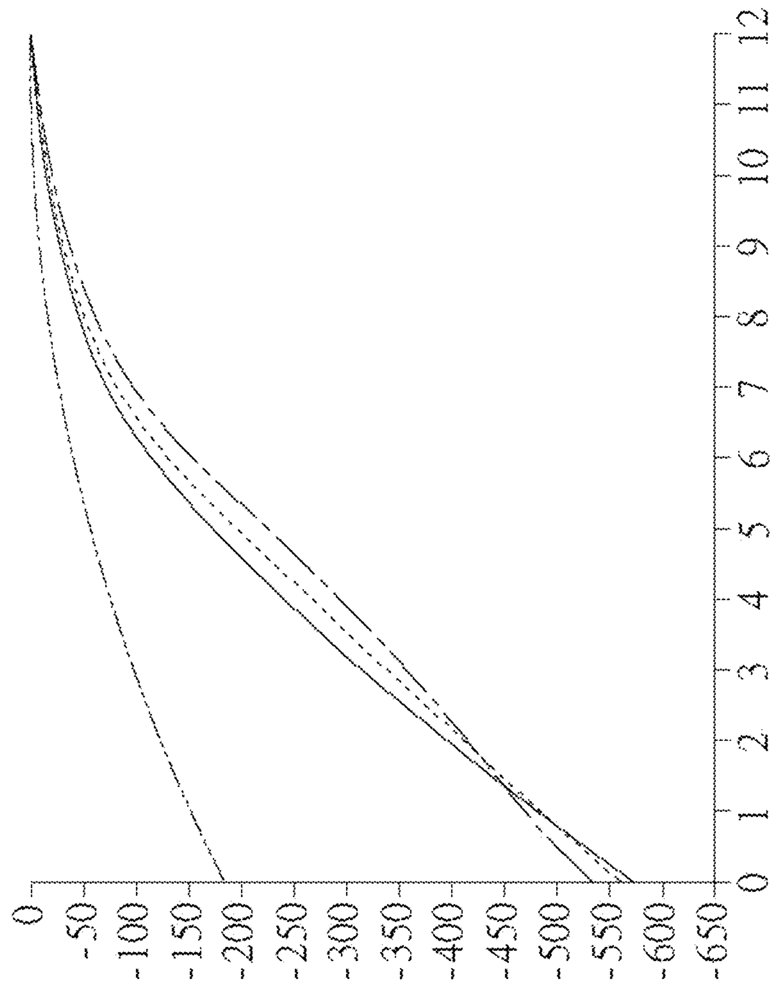
FIG. 3 is a comparison graph of the phase delay curves between the three-stage phase shifter and the first-stage phase shifter of a preferred embodiment of the present invention.
Figure 4:
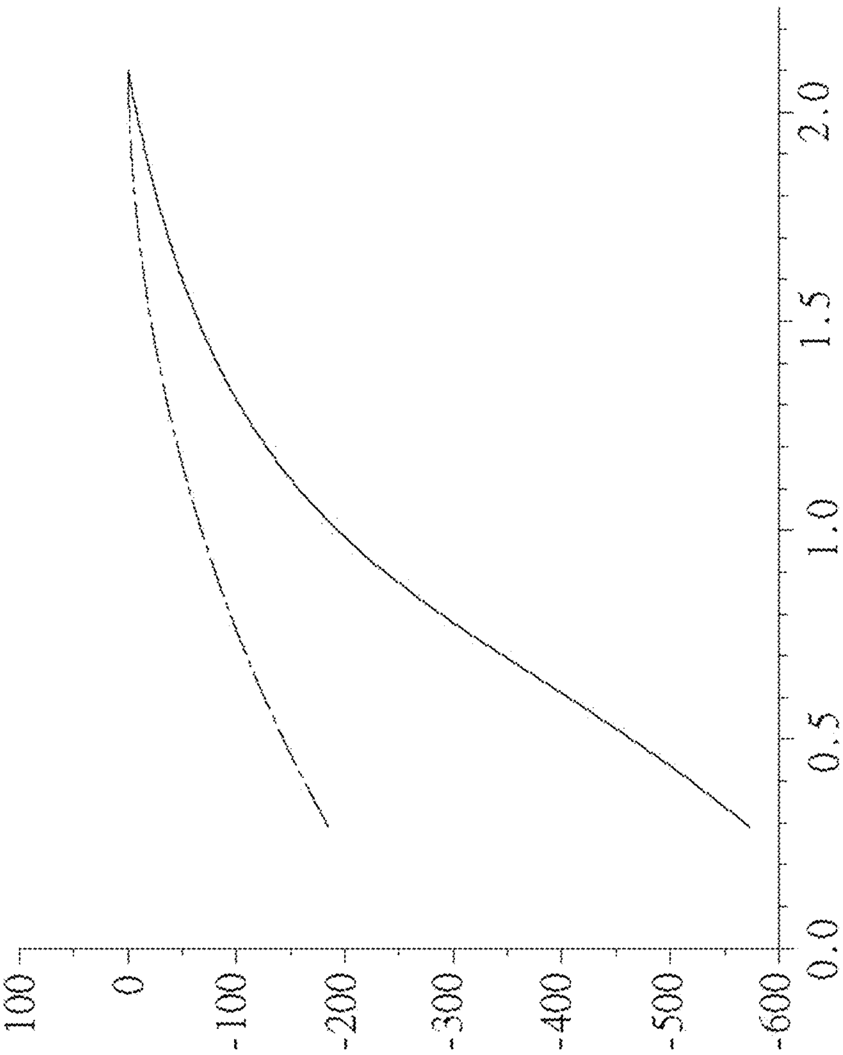
FIG. 4 is another comparison graph of the phase delay curves between the three-stage phase shifter and the first-stage phase shifter of a preferred embodiment of the present invention.

When the electronic control unit 30 controls the input control signal to each three-stage phase shifter 10 as a DC voltage, the phase delay curve is shown in FIGS. 3 and 4. In FIG. 3, the horizontal axis represents the voltage value of the input control signal from the electronic control unit 30 in volts, and the vertical axis represents the phase delay in degrees. The solid line represents a frequency of 3.3 GHz, the dashed line represents a frequency of 3.5 GHz, the single dotted line represents a frequency of 3.8 GHz, and the double dotted line represents the phase delay curve of a first-stage phase shifter at a frequency of 3.5 GHz. In FIG. 4, the horizontal axis represents the capacitance value of the three-stage phase shifter 10 in picofarads (pF), and the vertical axis represents the phase delay in degrees. The solid line represents the phase delay curve of the three-stage phase shifter 10, and the single dotted line represents the phase delay curve of the first-stage phase shifter.

Figure 8A:
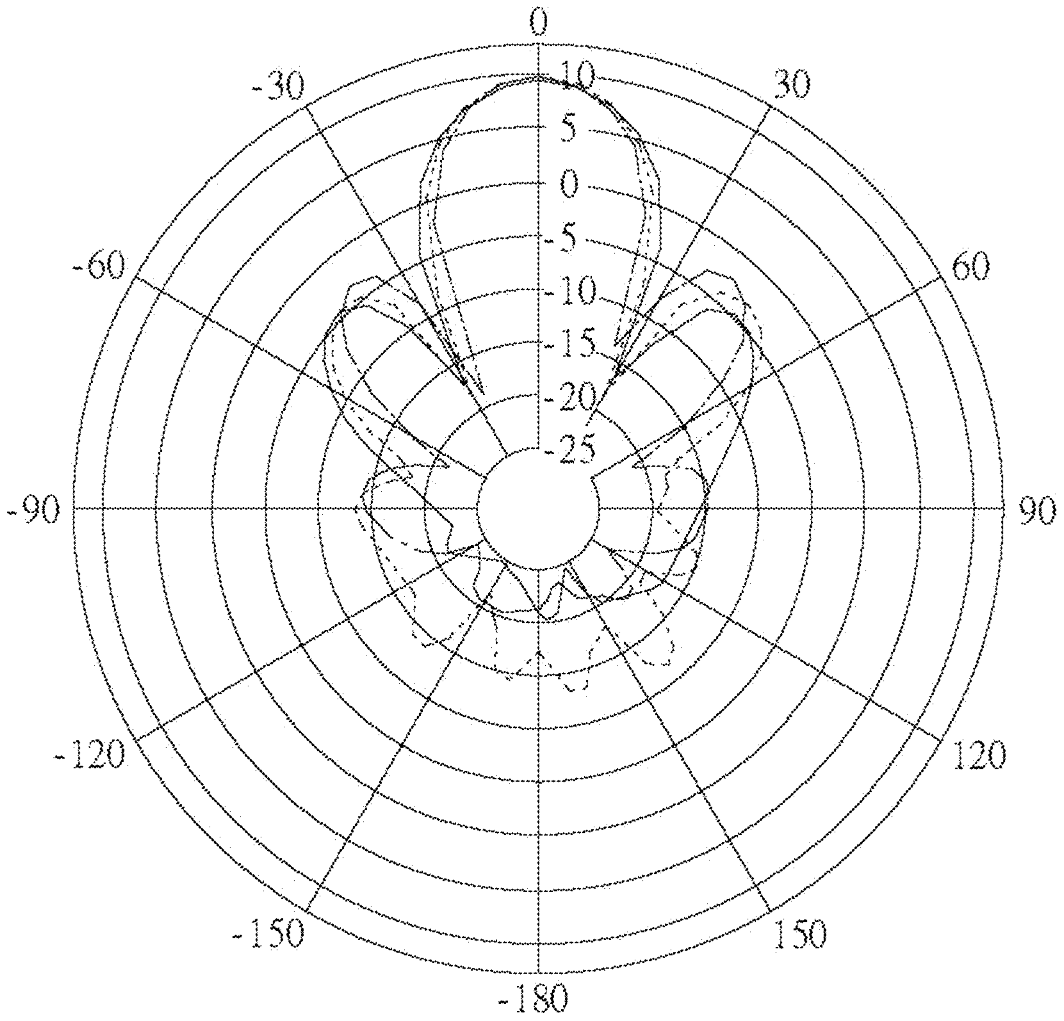
FIG. 8A is a diagram of the horizontal polarization field pattern with a beam angle of 0° controlling the radiation direction of the array in a preferred embodiment of the present invention.
Figure 8B:
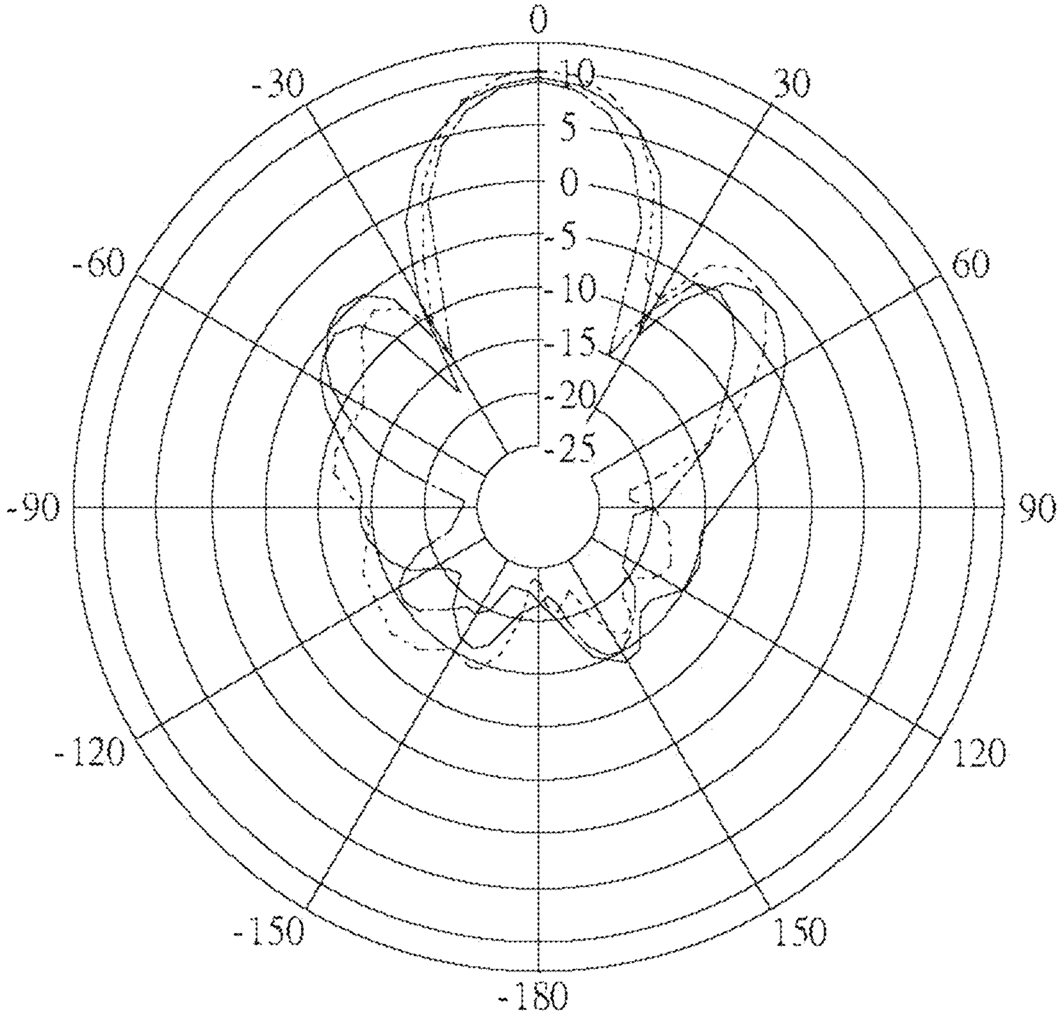
FIG. 8B is a diagram of the vertical polarization field pattern with a beam angle of 0° controlling the radiation direction of the array in a preferred embodiment of the present invention.
Figure 9A:
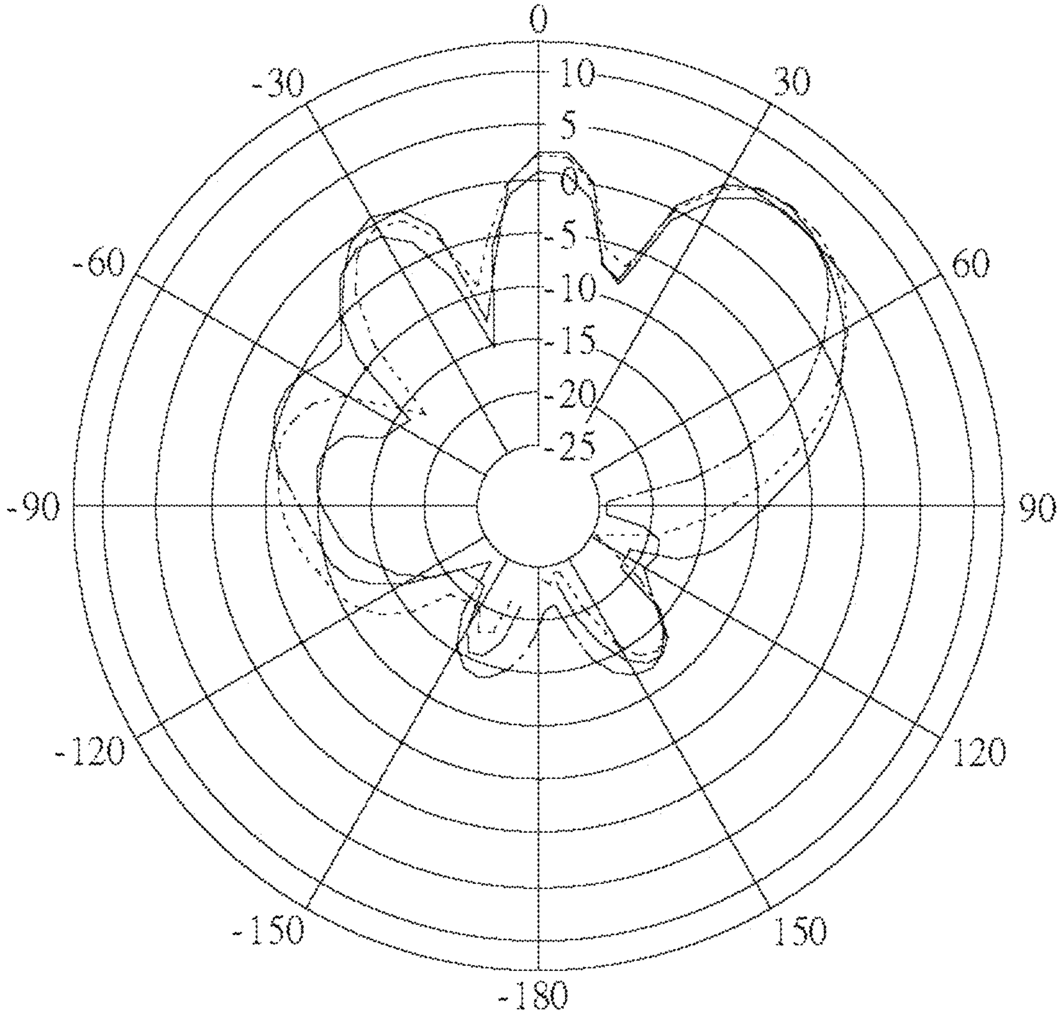
FIG. 9A is a diagram of the horizontal polarization field pattern with a beam angle of 45° controlling the radiation direction of the array in a preferred embodiment of the present invention.
Figure 9B:
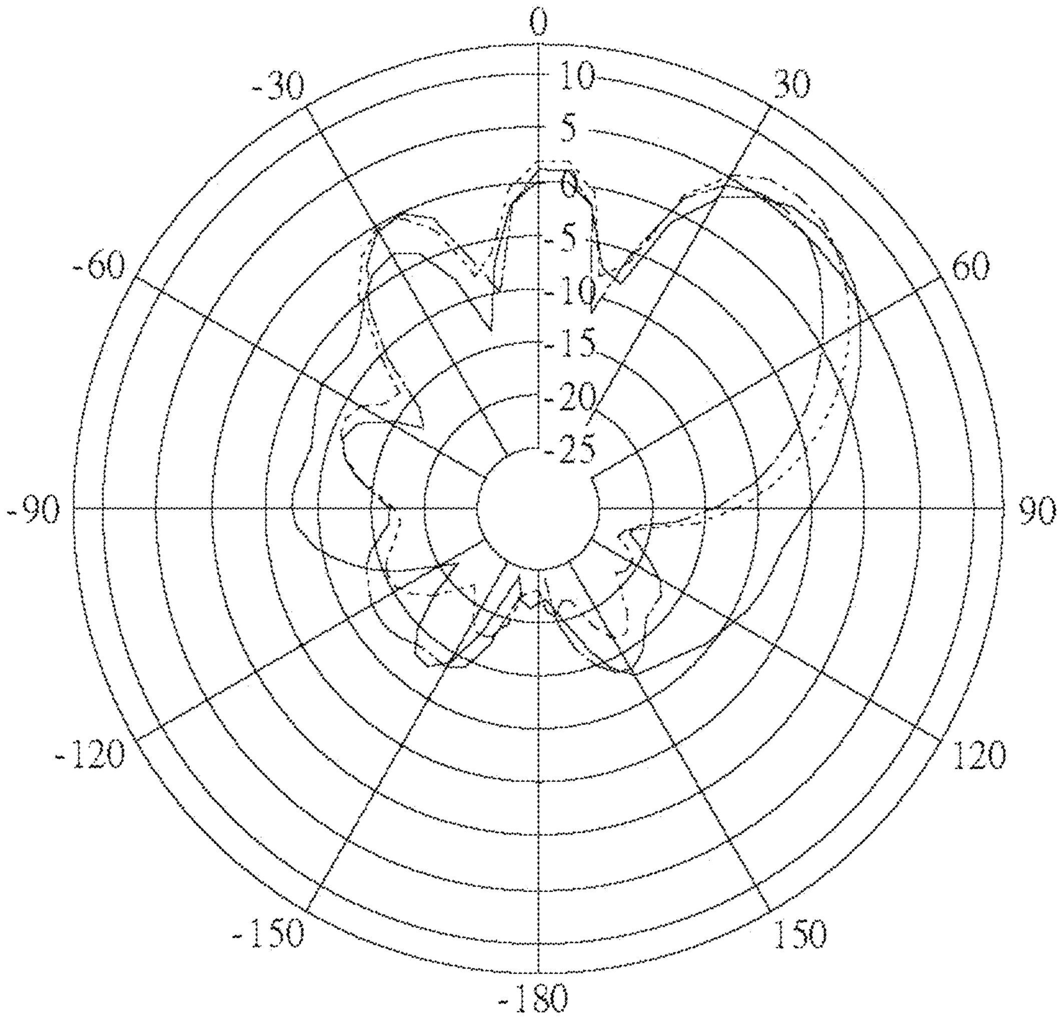
FIG. 9B is a diagram of the vertical polarization field pattern with a beam angle of 45° controlling the radiation direction of the array in a preferred embodiment of the present invention.
Figure 10A:
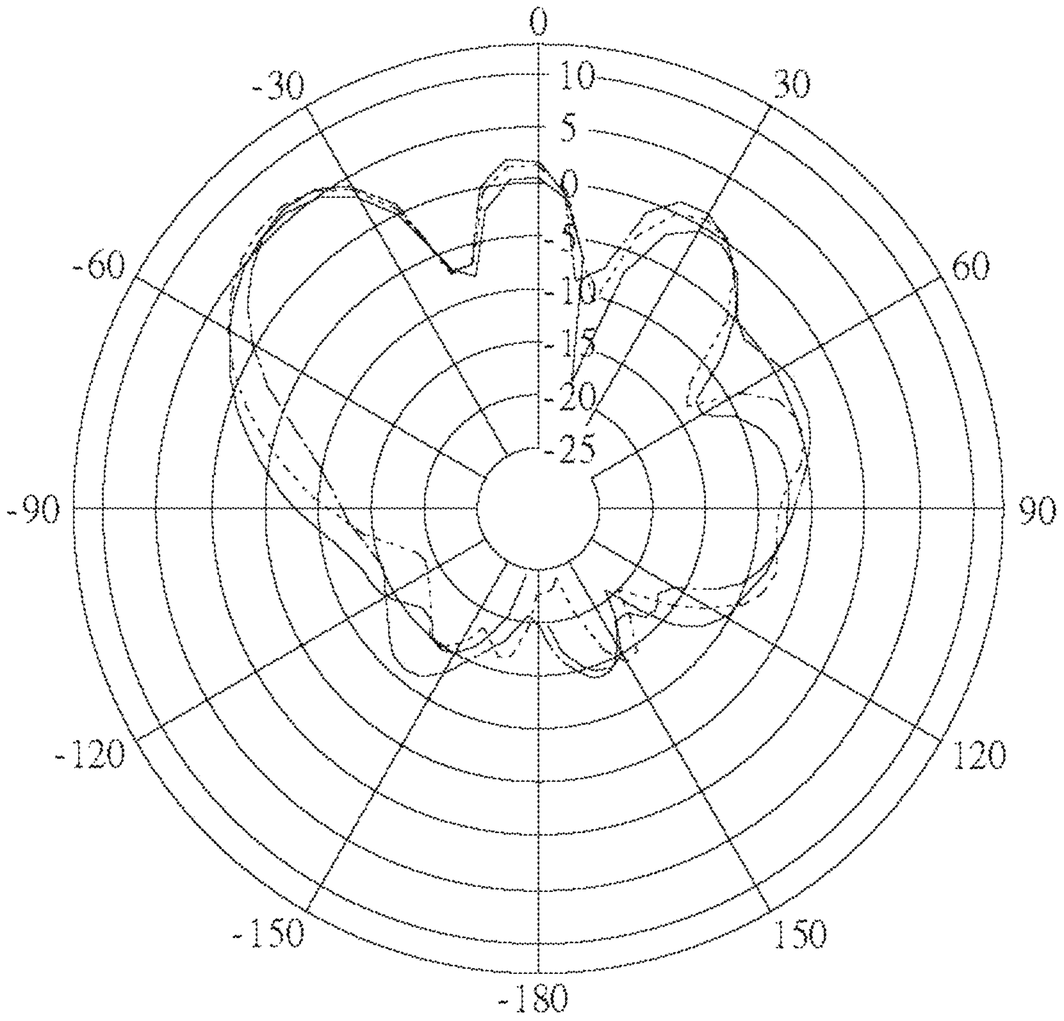
FIG. 10A is a diagram of the horizontal polarization field pattern with a beam angle of −45° controlling the radiation direction of the array in a preferred embodiment of the present invention.
Figure 10B:
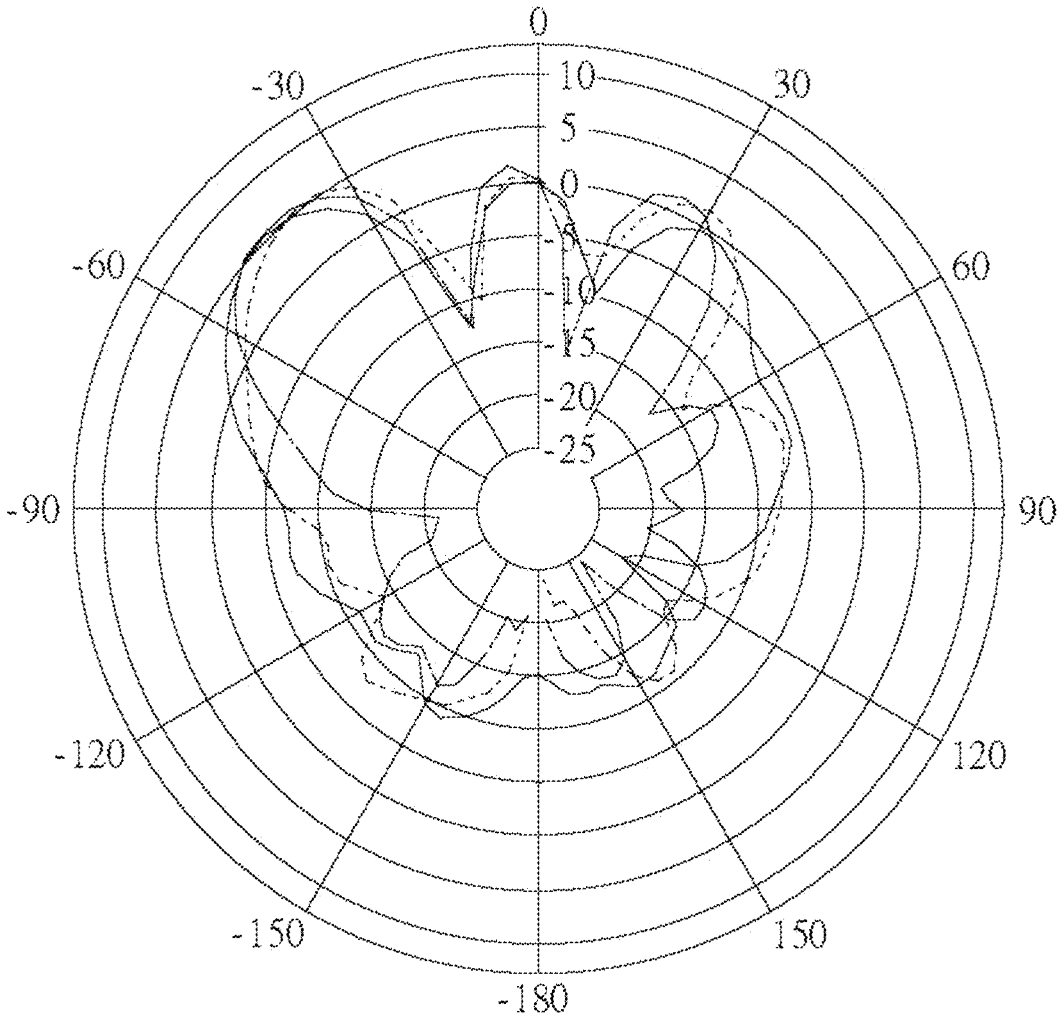
FIG. 10B is a diagram of the vertical polarization field pattern with a beam angle of −45° controlling the radiation direction of the array in a preferred embodiment of the present invention.

FIGS. 8A, 9A, and 10A illustrate the horizontal polarization field pattern diagrams for different beam angles controlling the radiation direction of the array, while FIGS. 8B, 9B, and 10B illustrate the vertical polarization field pattern diagrams for different beam angles controlling the radiation direction of the array. In these figures, the units along the circumferential direction are in degrees, and the units along the diametrical direction are in dB. In FIGS. 8A to 10B, the solid line represents a frequency of 3.3 GHz, the dashed line represents a frequency of 3.5 GHz, and the dotted line represents a frequency of 3.8 GHz.

By changing the control signal input to each three-stage phase shifter 10 with the electronic control unit 30, the beam angle of the radiation field pattern of the array antenna 20 can be varied. By using the three-stage phase shifters 10, a three-stage phase shift is achieved, where the phase delay angle variation range of the three-stage phase shifters 10 can reach 360°. When it is necessary to change the beam angle of the radiation field pattern over the full 360° circumference of the array antenna 20, the number of array antennas 20 required in the preferred embodiment can be reduced, thereby minimizing the space occupied by the preferred embodiment. The three-stage phase shifter 10 can vary the beam angle of the radiation field pattern of the array antenna 20 up to ±45°, compared to ±20° for the first-stage phase shifter antenna, providing a larger coverage area for the present invention.

As shown in FIG. 1, the electronic control unit 30 includes a microprocessor 32, a memory 34, and a control signal generation circuit 36. The memory 34 and the control signal generation circuit 36 are electrically connected to the microprocessor 32, and the control signal generation circuit 36 is coupled to each three-stage phase shifter 10. The memory 34 may optionally consist of a read-only memory medium or a read-write memory medium that stores a lookup table containing multiple control messages, each of which is associated with a different beam angle. The microprocessor 32 executes a program and, based on the desired beam angle, retrieves the appropriate control message from the lookup table. The microprocessor 32 then sends the appropriate electronic message corresponding to the control message to the control signal generation circuit 36. The control signal generation circuit 36 thereby generates the control signal and transmits the corresponding control signal to each three-stage phase shifter 10, thereby controlling the beam angle of the radiation field pattern of the array antenna 20.

The electronic control unit 30 is optionally coupled to a human-machine interface unit 50. The human-machine interface unit 50 is coupled to the microprocessor 32 so that the user can optionally operate the human-machine interface unit 50 to send instructions to the microprocessor 32, and the microprocessor 32 then executes the program according to the instructions to control the beam angle of the radiation field pattern of the array antenna 20.

By transmitting the control signal to each three-stage phase shifter 10 through the electronic control unit 30, the control signal can be automatically adjusted based on the program executed by the microprocessor 32, or optionally, the user can control the control signal transmitted by the electronic control unit 30 by operating the human-machine interface unit 50. During the process of adjusting the beam angle, it is not necessary to remove the array antenna 20 for adjustment.

As shown in FIG. 2, each of the RF signal input terminals 14 is coupled to each of the first phase shifting sections 11 constituting the respective three-stage phase shifter 10, with a first DC blocking capacitor 16 connected between each RF signal input terminal 14 and corresponding first phase shifting section 11 thereof, and each of the RF signal output terminals 15 is coupled to each of the third phase shifting sections 13 constituting the respective three-stage phase shifter 10 and the array antenna 20, with a second DC blocking capacitor 17 connected between each RF signal output terminal 15 and corresponding third phase shifting section 13 thereof. Multiple control signal input terminals 18 are coupled to the respective three-stage phase shifters 10 and the electronic control unit 30, with the electronic control unit 30 transmitting the control signal to each three-stage phase shifter 10 through the respective control signal input terminals 18.

Each of the control signal input terminals 18 can be optionally coupled to each of the third phase shifting sections 13 constituting the respective three-stage phase shifter 10 and the electronic control unit 30. Alternatively, each of the control signal input terminals 18 can be coupled to each of the first phase shifting sections 11 constituting the respective three-stage phase shifter 10 and the electronic control unit 30, or to each of the second phase shifting sections 12 constituting the respective three-stage phase shifter 10 and the electronic control unit 30, thereby forming variations of the preferred embodiment.

Figure 5:
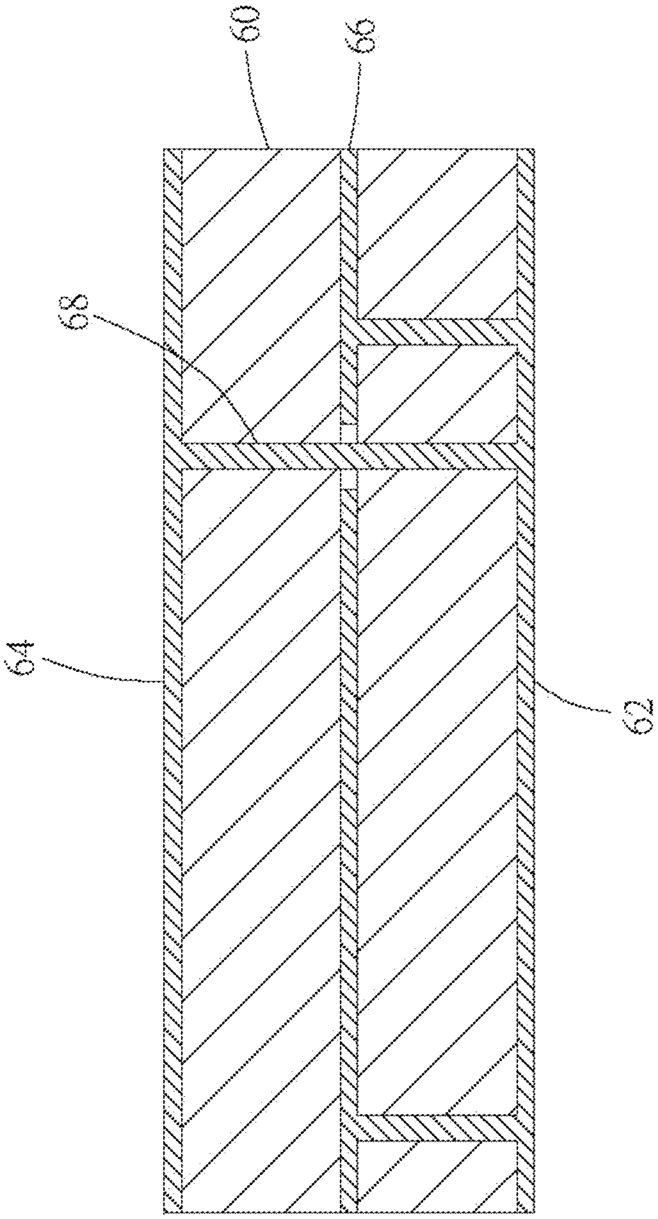
FIG. 5 is a cross-sectional view of the circuit board with the three-stage phase shifter and the array antenna configured in a preferred embodiment of the present invention.
Figure 6:
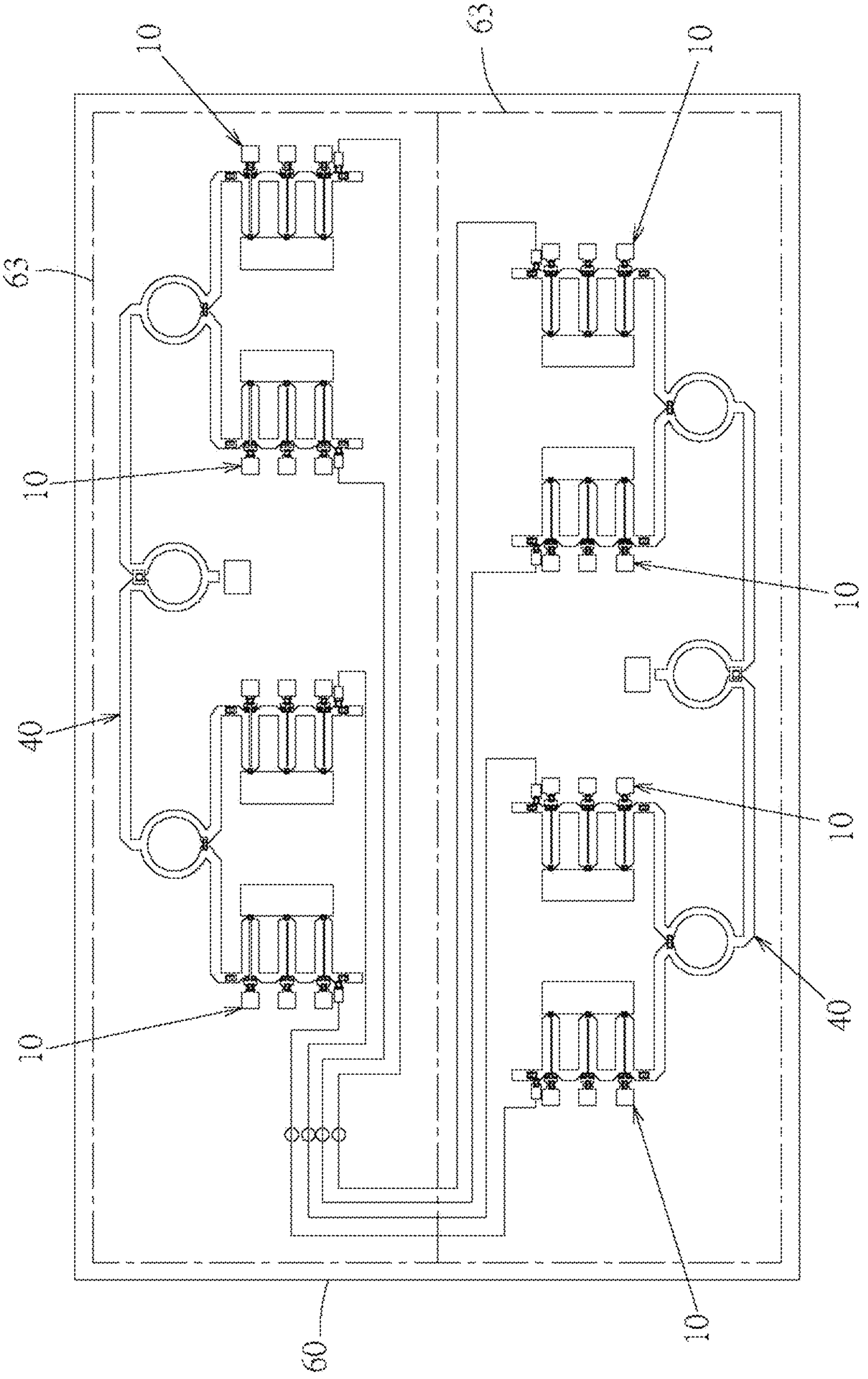
FIG. 6 is a layout diagram illustrating the arrangement of the three-stage phase shifter on the circuit board of a preferred embodiment of the present invention.
Figure 7:
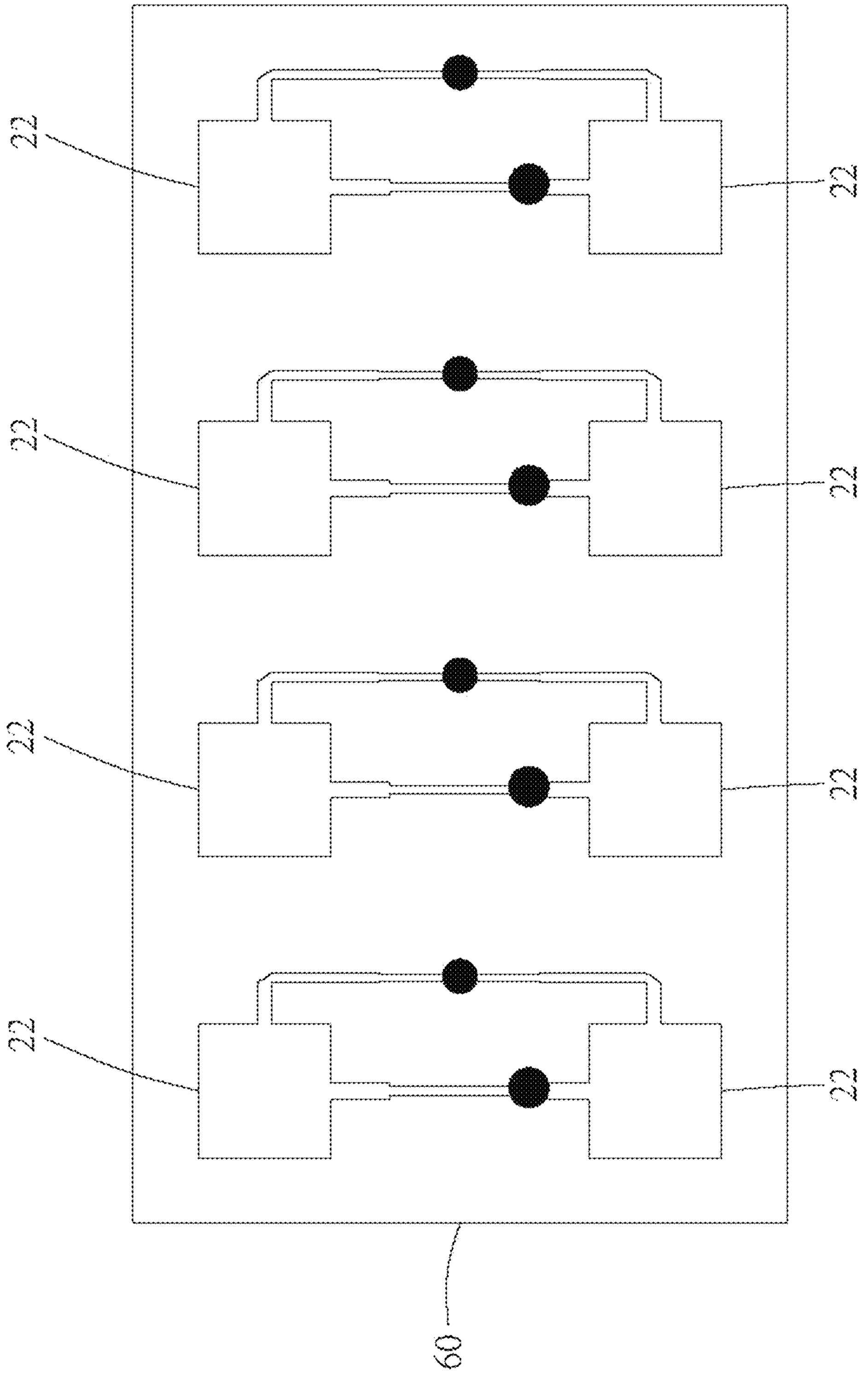
FIG. 7 is a layout diagram illustrating the arrangement of the array antenna on the circuit board of a preferred embodiment of the present invention.

As shown in FIGS. 5, 6, and 7, each of the three-stage phase shifters 10 and the power distribution network 40 employ a microstrip line layout composed of a conductive material to form a phase shifting layer 62 on a circuit board 60, while the array antenna 20 utilizes the conductive microstrip line layout to form an antenna layer 64 on the circuit board 60. The phase shifting layer 62 is formed on one side of the circuit board 60 in the thickness direction, and the antenna layer 64 is formed on the other side of the circuit board 60, also in the thickness direction. A ground layer 66 is formed inside the circuit board 60, positioned between the phase shifting layer 62 and the antenna layer 64. Each first phase shifting section 11, second phase shifting section 12, and third phase shifting section 13 is respectively grounded to the ground layer 66. Multiple conductive transmission sections 68 are positioned inside the circuit board 60, with each transmission section 68 coupled to the respective three-stage phase shifter 10 and the array antenna 20. FIG. 6 shows two phase shifting units 63 for independently controlling the beam angles of the horizontal polarization field pattern and the vertical polarization field pattern of the array antenna 20.

By forming the microstrip line layout of each three-stage phase shifter 10, the power distribution network 40, and the array antenna 20 composed of conductive material on the circuit board 60, the overall space requirement of the device can be effectively reduced, and the signal transmission stability of the three-stage phase shifter 10, the power distribution network 40, and the array antenna 20 can be improved.

The invention claimed is:

1. An antenna device comprising:

a plurality of three-stage phase shifters in which each three-stage phase shifter has a first phase shifting section and a second phase shifting section and a third phase shifting section connected sequentially in series, wherein each three-stage phase shifter of said plurality of three-stage phase shifters being coupled to a radio frequency signal input terminal and a radio frequency signal output terminal;

an antenna array arranged in a pattern, said antenna array being coupled to one of said plurality of three-stage phase shifters;

a power distribution network coupled to the radio frequency signal input terminal, wherein said plurality of three-stage phase shifters are parallel to each other and are coupled to said antenna array through respective radio frequency signal output terminals so as to allow said power distribution network to feed an input radio frequency signal to each three-stage phase shifter of said plurality of three-stage phase shifters through respective radio frequency signal input terminals, wherein each three-stage phase shifter of said plurality of three-stage phase shifters feeds an output radio frequency signal to said array antenna through the respective radio frequency signal output terminals; and an electronic control unit connected to said plurality of three-stage phase shifters so as to allow said electronic control unit to control input control signals to each three-stage phase shifter of said plurality of three-stage phase shifters, wherein each of said plurality of three-stage phase shifters and said power distribution network and said antenna array have a microstrip line layout composed of a conductive material, wherein said plurality of three-stage phase shifters and said power distribution network are formed on one side of a circuit board, said antenna array being formed on another side of the circuit board, the circuit board having a ground layer formed therein, each three-stage phase shifter of said plurality of three-stage phase shifters being grounded to the ground layer.

2. The antenna device of claim 1, wherein said electronic control unit comprises:

a microprocessor;

a memory; and a control signal generation circuit, said memory and said control signal generation circuit being electrically connected to said microprocessor, said control signal generation circuit being coupled to each three-stage phase shifter of said plurality of three-stage phase shifters, said memory adapted to store a lookup table that contains multiple control messages, the multiple control message being directed to respective different beam angles, wherein said microprocessor executes a program adapted to retrieve one of the multiple control messages from the lookup table and sends an electronic message corresponding to the one control message to said control signal generation circuit so as to allow said control signal generation circuit to transmit a corresponding control signal to each three-stage phase shifter of said plurality of three-stage phase shifters in order to control a beam angle of a radiation field pattern of said array antenna.

3. The antenna device of claim 2, wherein said microprocessor is coupled to a human-machine interface unit and adapted to allow an operator to send instructions to said microprocessor through the human-machine interface unit so as to control the beam angle of the radiation field pattern of said array antenna.

4. The antenna device of claim 2, wherein the control signal is selected from the group consisting of a DC voltage, a current, a magnetic field, a low-frequency signal, a high-frequency signal, a signal phase, an electromagnetic signal and a pulse.

5. The antenna device of claim 3, wherein the control signal is selected from the group consisting of a DC voltage, a current, a magnetic field, a low-frequency signal, a high-frequency signal, a signal phase, an electromagnetic signal and a pulse.

6. The antenna device of claim 1, wherein each of the radio frequency signal input terminals is coupled to the first phase shifting section, a first DC blocking capacitor being connected between each radio frequency signal input terminal and a corresponding first phase shifting section, each of the radio frequency signal output terminals being coupled to each of the third phase shifting sections, a second DC blocking capacitor connected between each radio frequency signal output terminal and the corresponding third phase shifting section thereof, wherein multiple control signal input terminals are coupled to respective three-stage phase shifters and the electronic control unit.

* * * * *